W. SMITH.
Construction of Domes or Crowns of Gas and other Furnaces.

No. 218,584. Patented Aug. 12, 1879.

Witnesses.

Inventor.
William Smith
by Bakewell & Kerr
Attorneys

UNITED STATES PATENT OFFICE.

WILLIAM SMITH, OF PITTSBURG, PENNSYLVANIA, ASSIGNOR TO PAMELA SMITH, OF SAME PLACE.

IMPROVEMENT IN CONSTRUCTION OF DOMES OR CROWNS OF GAS AND OTHER FURNACES.

Specification forming part of Letters Patent No. 218,584, dated August 12, 1879; application filed December 5, 1878.

*To all whom it may concern:*

Be it known that I, WILLIAM SMITH, of Pittsburg, in the county of Allegheny and State of Pennsylvania, have invented a new and useful Improvement in the Construction of Furnace Domes or Crowns for the Manufacture of Gas, &c.; and I do hereby declare the following to be a full, clear, and exact description thereof, reference being had to the accompanying drawings, forming a part of this specification, in which—

Figure 1:
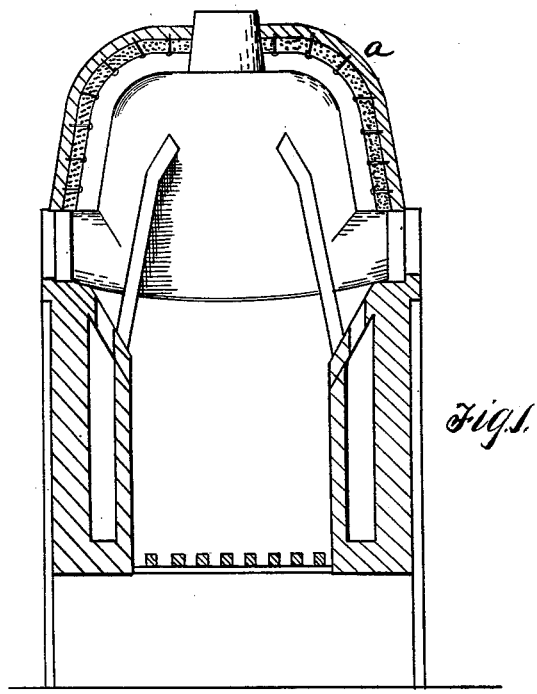
Figure 2:
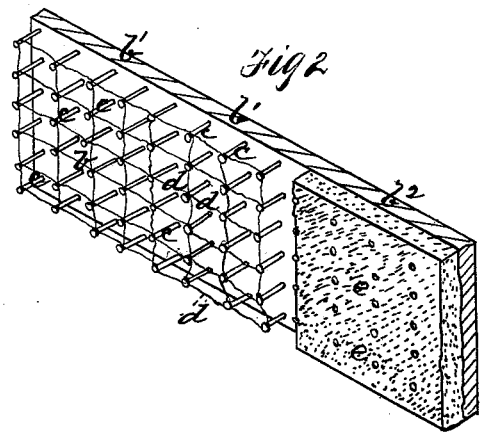

Figure 1 is a vertical section of a gas-producing furnace embodying my invention; and Fig. 2 is a view of a portion of the cap or crown of the same.

Like letters of reference indicate like parts in each.

My invention has for its object the improvement of the construction of walls and caps of furnaces, and especially of the class shown in Letters Patent No. 197,420, granted to me on November 20, 1877, for apparatus for the manufacture of gas; and it consists in forming the dome or crown of furnaces of metal protected by refractory material, said refractory material being applied to the metal plates in a plastic condition and allowed to harden thereon, and being bound thereto by a series of pins or projections and a net-work of wire, whereby an effective, durable, and inexpensive crown or cap is obtained.

Heretofore, in the construction of this class of furnaces, the dome or crown has commonly been constructed either of metallic plates unprotected from the direct action of the heat, and consequently liable to crack or rapidly burn out, or from tile, which it required considerable labor and skill to produce and properly set so as to render the crown durable.

It is well known that a metal cap or crown for furnaces, especially small furnaces, can be more readily produced and applied than any other, and would therefore be preferable to others if it could be rendered durable with little expense.

The object, therefore, of the present invention is to overcome the existing objections to metallic crowns or caps for furnaces.

I will now proceed to describe my invention, so that others skilled in the art to which it appertains may apply the same.

In the drawings, Fig. 1 shows this invention applied to one of my gas-furnaces, and I remark that in this furnace my improvement is chiefly useful in the construction of the dome or cap $a$, a portion of which appears detached in Fig. 2. In this view, in order to clearly illustrate the construction, I show at $b^1$ a section with the projections and wires $d$, and at $b^2$ a section lined with the refractory material $e$.

The projections $c$ are short and headed. They may be made with the plate by casting, or may be inserted and the ends upset, as in case of a rivet, or in any other suitable or convenient manner.

The refractory material must necessarily be plastic when applied, and must be plastered in and around the projections and wires, so that they will be thoroughly embedded in or surrounded thereby. In making this plastic, I use, by preference, equal parts of sand, fire-clay, and asbestus mixed with water. I can, however, use simply fire-clay and sand, or asbestus and sand, or a composition of equal merit made of other and different ingredients in various proportions; but this I do not wish to be limited in, as all that I require is a plastic made of refractory materials which will harden properly by heat on the plate, and many such plastics are well known and in use. I prefer to add salt to the composition, so that the lining will be glazed externally by the heat. This gives it increased refractory power and durability.

As remarked, the use of the wires extending through and embedded in the lining makes it more secure than the use of the projections alone. So, also, the use of heads on the projections is better than the use of plain unheaded projections or pins.

A furnace constructed of metallic plates so lined is superior to the unlined furnaces in that the walls retain and confine to the furnace much of the heat which formerly passed through them and was lost. This plate necessitates the use of much less fuel. I have by actual experience found this saving in my gas-furnace to be equal to one-half of the fuel.

Moreover, it saves the metal plates from being burned out so soon. In all portable furnaces, it is of very great advantage over ordinary tile-linings, which are necessarily very thick, while my lined plates are comparatively thin. Such linings cannot be put in in many places, and are liable to break, which is not the case with with my improved plates.

I am aware that metallic plates having a covering of refractory material bound thereto by pins, pegs, or projections have heretofore been employed in the formation of furnace-doors, &c., and do not herein claim the same; but

What I claim as my invention, and desire to secure by Letters Patent, is—

A crown, cap, or dome for gas and other furnaces, the same consisting of a metallic plate or plates provided with pins having an interlacing of wire, and of a lining of refractory material, the pins and wire being embedded in the refractory material, and the whole combined substantially in the manner and for the purpose specified.

In testimony whereof I, the said WILLIAM SMITH, have hereunto set my hand.

WILLIAM SMITH.

Witnesses:
T. B. KERR,
A. C. JOHNSTON.